April 30, 1963     K. V. LIVELSBERGER ETAL     3,087,748
RETRACTIBLE TRAILER SUPPORT
Original Filed May 19, 1958     4 Sheets-Sheet 4
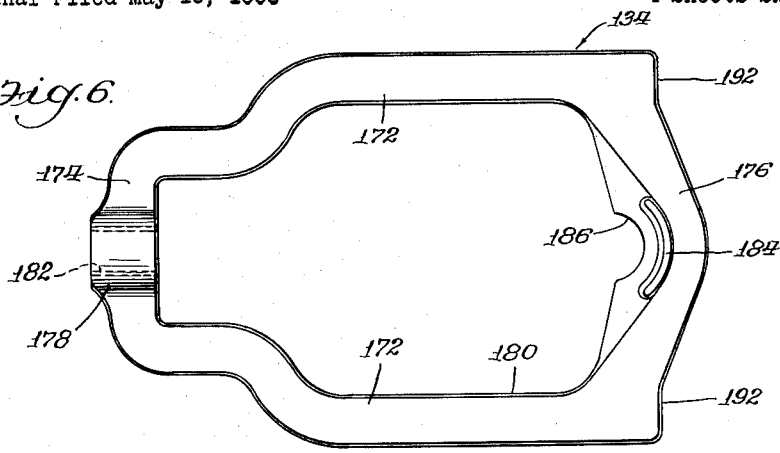
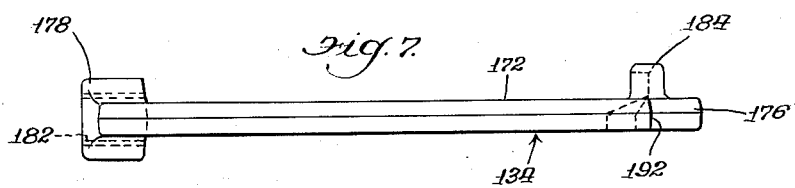
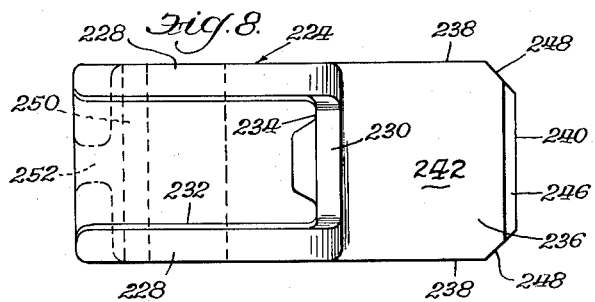
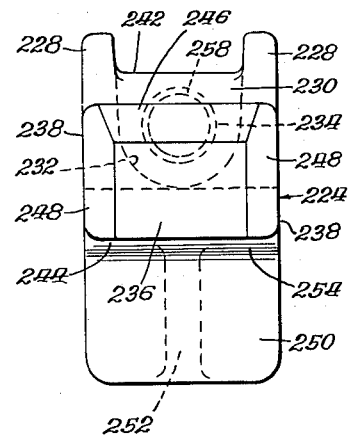
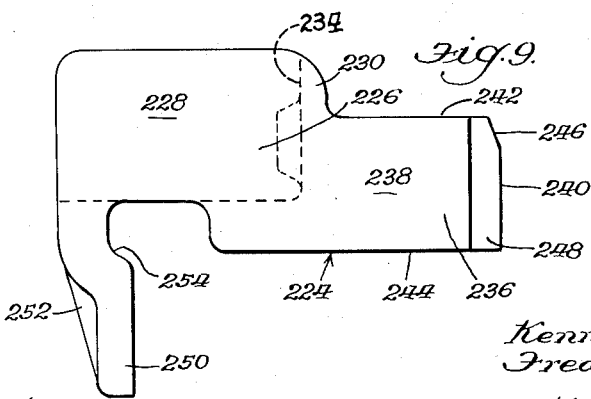
INVENTORS.
Kenneth V. Livelsberger
Frederick C. Kulieke
By: Walter L. Schlegel Jr.
Atty.
Witness:
Charles H. Bassett United States Patent Office 3,087,748
Patented Apr. 30, 1963

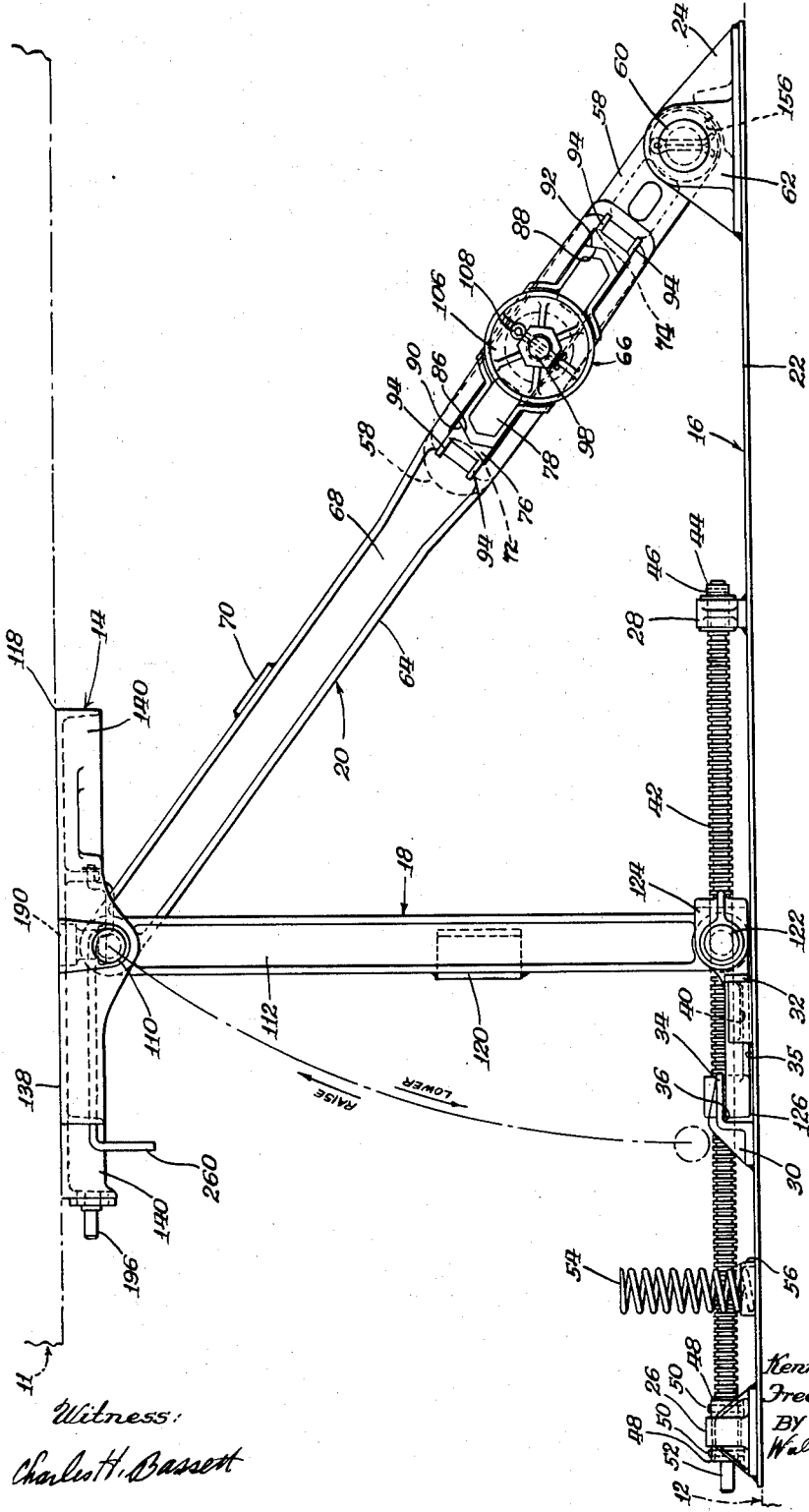

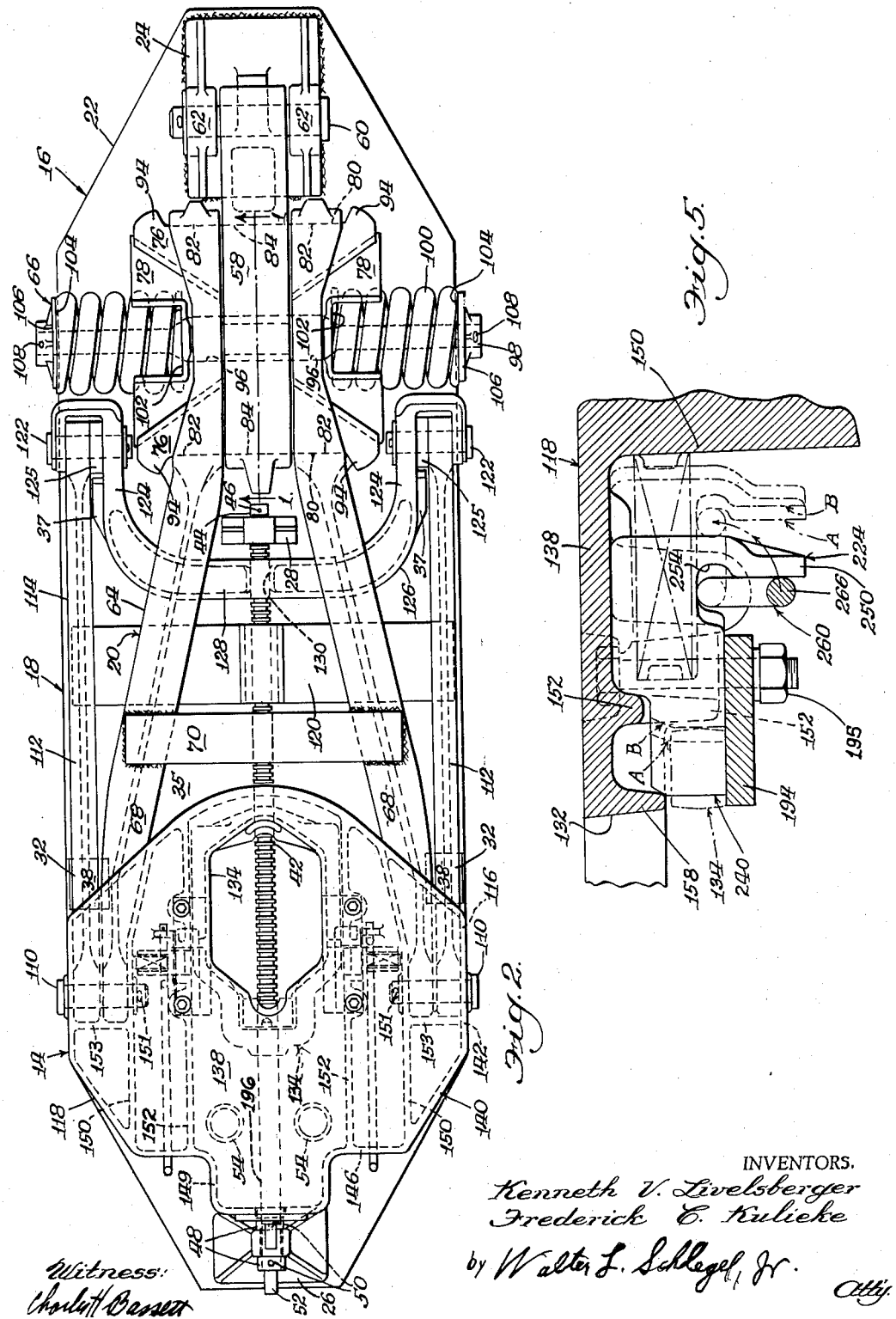

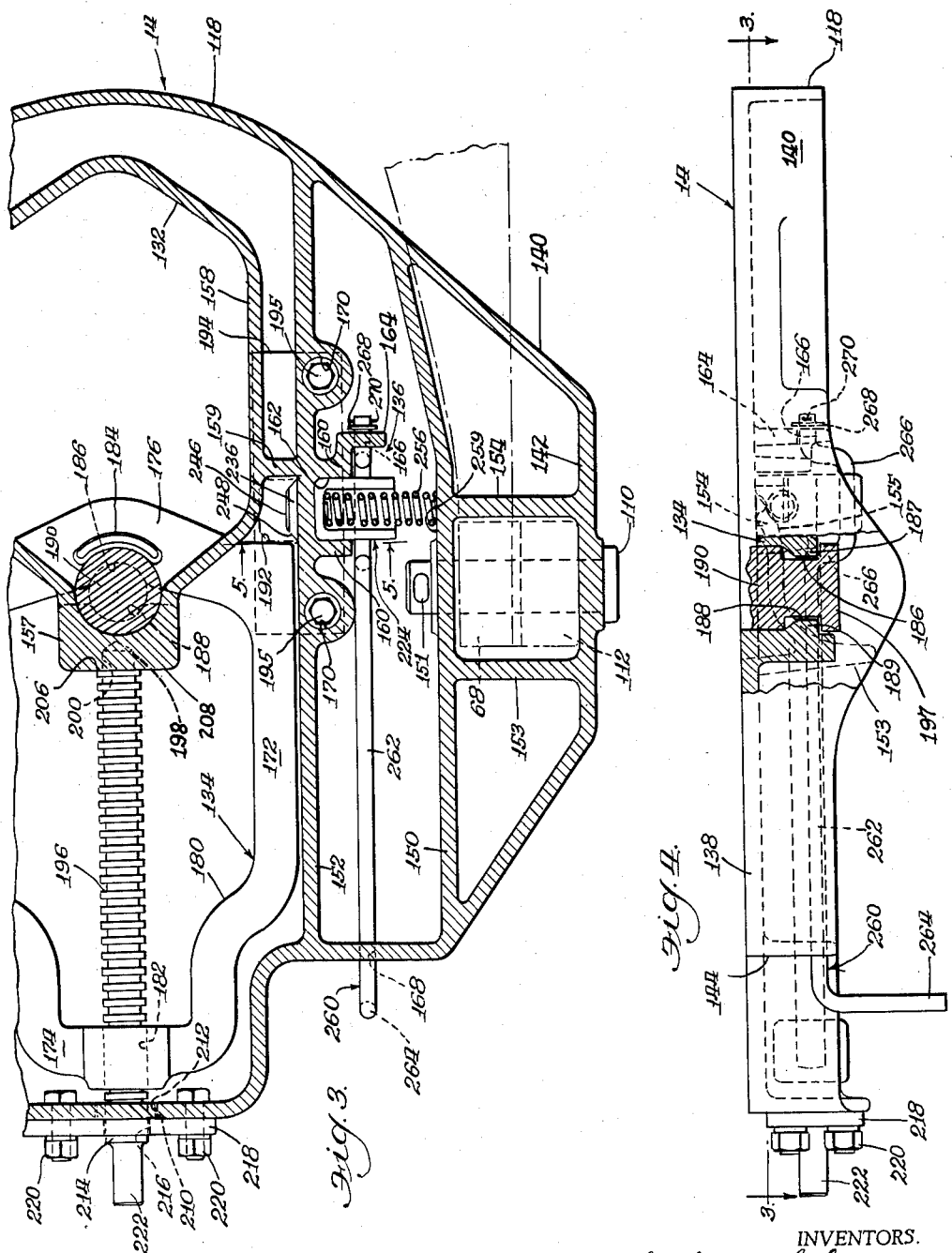

3,087,748
RETRACTIBLE TRAILER SUPPORT
Kenneth V. Livelsberger and Frederick C. Kulieke, Alliance, Ohio, assignors to Amsted Industries Incorporated, Chicago, Ill., a corporation of New Jersey
Original application May 19, 1958, Ser. No. 736,289. Divided and this application Apr. 4, 1960, Ser. No. 27,233
4 Claims. (Cl. 287—20)

This invention relates to retractible trailer supports of the type employed to support semi-trailers from the floors or beds of railway flat cars. This application is a division of application Serial No. 736,289 filed May 19, 1958.

The invention is particularly concerned with an improved trailer support of the type wherein a 5th wheel type locking plate assembly, adapted to receive and retain the king pin of a supported trailer, is supported from the floor of a railway car by a collapsible supporting mechanism which can be quickly raised or lowered to accommodate rapid loading and unloading of the trailer on and off the car.

One object of the invention is to provide in a trailer support of this type a retractible supporting structure that includes resilient cushioning means to yieldingly resist forces, both in draft and buff, exerted by the trailer on the structure, as a result of longitudinal shocks incurred by the trailer or car during operation of the train.

Another object of the invention is the provision of a trailer support which includes a movable king pin clamping jaw member and automatic locking means to retain the jaw in closed or jaw clamping position.

A more specific object of the invention is the provision of a locking plate supporting structure which includes a support member connected to the locking plate, a yoke connected to a base plate on the floor of the car, and a cushioning device compressibly interposed between and interconnecting the support member and the yoke.

These and other objects of the invention will be apparent from an examination of the following description and drawings, wherein:

FIGURE 1 is a fragmentary side elevational view illustrating portions of a semi-trailer supported from the bed of a railway flat car by a retractible trailer support embodying features of the invention;

FIGURE 2 is a top plan view of the trailer support illustrated in FIGURE 1, but with the support shown in a retracted position;

FIGURE 3 is a fragmentary transverse section of the locking plate assembly taken on line 3—3 of FIGURE 4, only slightly more than half of the structure being shown as it is symmetrical about its longitudinal vertical center plane;

FIGURE 4 is a side elevational view of the structure illustrated in FIGURE 3, with portions of the structure shown in longitudinal vertical section taken approximately through the center of the king pin;

FIGURE 5 is a fragmentary enlarged vertical section taken on line 5—5 of FIGURE 3 with alternate positions of the lock shown by phantom lines;

FIGURES 6 and 7 are top plan and side elevational detail views, respectively, of the jaw illustrated in FIGURE 3, and FIGURES 8–10 are top plan, side elevation and end elevation detail views of the lock illustrated in FIGURE 5.

Referring now to the drawings for a better understanding of the invention and particularly to FIGURE 1, it will be seen that a trailer body, a portion of which is indicated by phantom line 11, is shown as supported from the bed of a railway flat car, a portion of which is indicated by phantom line 12, by a retractible trailer support embodying various features of my invention.

The trailer support generally comprises a locking plate assembly, indicated generally at 14, supported from a base plate assembly 16, by a pair of generally vertically and diagonally extending support frame assemblies 18 and 20, respectively.

As best seen in FIGURE 2, support base plate assembly 16 comprises a generally thin flat elongated plate 22 which may be secured to the floor of any conventional flat car in any desired manner (not shown) such as by welding, riveting, or bolting, without requiring any altering or remodeling of the flat car.

Mounted on a central portion of base plate 22 at a location adjacent one end thereof is a support frame fulcrum bracket 24. As seen in FIGURE 1, bracket 24 is disposed at the right hand end of plate 22. In order to insure the use of consistent terminology throughout the specification, the right hand end of plate 22 will be referred to as the rearward end, and the left hand end will be referred to as the forward end.

Referring again to FIGURE 2, it will be seen that also affixed to plate 22, and preferably disposed in general longitudinal alignment with bracket 24, are a pair of pillow blocks 26 and 28 located adjacent the forward end of the plate and rearwardly of the center of the plate, respectively. The bracket and pillow blocks may all be secured to the plate in any desired manner, such as by welding.

Additionally, base plate assembly 16 includes pairs of center cross head stops and side cross head stops 30 (only one of which is shown) and 32, respectively, which also may be rigidly secured to base plate 22 in any desired manner such as by welding. Center stops 30 are spaced from each other on opposite sides of the longitudinal vertical center plane of the plate and are located approximately one third of the way in from the forward end of the plate. Side stops 32 are located on opposite sides of plate 22 outboardly and slightly rearwardly of center stops 30. Center stops 30 each include a horizontal rearwardly extending ledge or shelf 34 spaced from the upper surface 35 of plate 22 and defining therewith a slot 36. Side stops 32 each include an inboardly extending horizontal shelf or ledge 38 spaced from and defining with plate surface 35 a slot 40. The functions of the cross head stops will be explained later in the specification.

Extending longitudinally of plate 22 is an elevating screw 42 threaded intermediate its ends and having non-threaded forward and rearward end portions journaled in the forward and rear pillow blocks 26 and 28, respectively. The rear end of screw 42 may be retained in place by a thrust collar 44 disposed rearwardly of pillow block 28, and a pin 46 extending through the collar and screw; the forward end of the screw may be retained in place, and the longitudinal movement of the screw thereby prevented, by a pair of forward thrust collars 48, disposed on opposite side of pillow block 26, and a pair of pins 50 extending through the respective collars and the screw. At its forward extremity, elevating screw 42 may be provided with a head 52 that is square in cross section to accommodate the use of a manual or power operated wrench in rotating the screw.

Also included in base plate assembly 16 are a pair of vertically extending compression springs 54 located on opposite sides of the longitudinal vertical center plane of the plate preferably a short distance rearwardly of pillow block 26 with their lower ends mounted in spring retainers 56 on base plate 22.

As best seen in FIGURES 1 and 2, diagonal support frame assembly 20 comprises a yoke 58 pivotally connected at its rearward end by pin 60 to spaced upstanding lugs 62 of fulcrum bracket 24 and having its forward end connected to a diagonal support frame 64 by means of a draft gear assembly indicated generally at 66. Diagonal support frame 64 comprises a pair of legs 68 spaced from each other at their forward ends, preferably interconnected intermediate their ends by a transversely extending tie bar or strap 70 rigidly secured to the respective legs, and disposed adjacent each other on opposite sides of the yoke at their rearward ends. Thus, the legs and tie bar form a generally A-shaped frame. The rearward ends of legs 68 present transversely extending slots 72 in alignment with each other and with a related transverse slot 74 in yoke 58, which is snugly interposed between the rearward ends of the legs.

Draft gear assembly 66, which interconnects diagonal support frame legs 68 and yoke 58, comprises a pair of front and rear wedges or friction shoes 76 and a pair of side wedges 78 fitted together as quadrants to form a generally rectangular bar or key received within aligned slots 72 and 74 of the legs and yoke, respectively. Front and rear wedges 76 present transversely extending forwardly and rearwardly facing surfaces 80 which are engageable with transversely extending forwardly and rearwardly facing surfaces 82 and 84 presented by the leg and yoke slots, respectively. Front and rear wedges also present rearwardly converging and forwardly converging forward and rearward surfaces 86 and 88, respectively (FIGURE 1), which are engageable with complementary inwardly converging forward and rearward surfaces 90 and 92, respectively, presented by side wedges 78. The front and rear wedges may both be provided outwardly adjacent the ends of their transverse surfaces 80 with gibs 94 which are engageable with the sides of the legs 68 and serve to retain the front and rear wedges within the leg and yoke slots. Side wedges 78 are provided with centrally disposed aligned apertures 96 through which extends a transversely disposed spring rod 98 on which are sleeved a pair of coil compression springs 100 compressed on opposite sides of the yoke and legs between outboardly facing spring seats 102 presented by the respective side wedges and inboardly facing spring seats 104 presented by respective spring caps 106 which may be retained on opposite ends of rod 98 by pins or cotters 108.

The forward ends of diagonal frame legs 68 may be pivotally connected to opposite sides of locking plate assembly 14 and to the forward ends of respective legs 112 of a vertical support frame 114 by a pair of pins 110 disposed to extend transversely through aligned apertures of flanges 140 and 150 depending from opposite sides of locking plate 118 and which may be retained in place by cotters 151.

As best seen in FIGURE 2, vertical support frame 114 is generally H-shaped and comprises the transversely spaced longitudinally extending pair of parallel legs 112 which may be interconnected intermediate their ends by a transversely extending tie bar strap 120. The rearward ends of legs 112 may be pivotally connected by pins 122 to the rearward ends of arms 124 of a cross head 126. Cross head 126 is generally U-shaped and comprises a transversely extending bar 128 having at its outboard ends the parallel arms 124 preferably formed integrally therewith and extending rearwardly therefrom. The central portion of bar 128 is enlarged and presents a threaded aperture or opening 130 extending longitudinally therethrough. Aperture 130 is adapted to receive and threadably engage elevating screw 42 whereby rotation of the screw about its longitudinal axis in pillow blocks 26 and 28 will cause cross head bar 128 to move forward or backward on the screw relative to base plate 22, the direction of movement being dependent upon the direction of rotation of the elevating screw 42. To facilitate movement of the cross head on the base plate the pivotal connections between the support legs 112 and cross head arms 124 may include rollers 125 carried on pins 122.

As best seen in FIGURES 2 and 3, locking plate assembly 14 comprises the locking plate itself 118, a movable jaw 134 carried by the plate and operating and locking means, indicated generally at 136, also carried by the plate for moving the jaw relative to the plate and returning it in certain positions.

Plate 118 is somewhat irregular in shape as seen in plan, although its particular contour is not critical, and comprises a normally horizontally disposed relatively flat plate or wall 138, with a centrally disposed king pin receiving aperture 132 extending vertically therethrough, having an uninterrupted peripheral flange 140 depending from the outer edge thereof.

On each side of its longitudinal center line plate wall 138 has depending therefrom a pair of longitudinally extending outboard and inboard flanges 150 and 152, respectively, which preferably merge at their ends with the front and rear sections of peripheral flange 140. Flanges 150 and 152 are, for the most part, parallel to each other and to the side sections of flange 140. Flanges 150 are each spaced inboardly a short distance from the related side sections 142 of flange 140 and may be connected thereto by transverse vertical ribs 153 as well as by curved transverse webs 154. In addition to adding rigidity to the structure, webs 154 each present a curved downwardly facing abutment surface 155 spaced closely adjacent the rounded ends of support frame legs 68 and 112 which are pivotally connected to each other and to locking plate 118 by pins 110 extending through aligned apertures of locking plate flanges 140 and 150. Thus, each web 155 aids in relieving the load or stress on adjacent pivot pin 110.

It will also be noted that support frame fulcrum bracket 24 is also provided intermediate its lugs 62 with a curved abutment surface 156, FIGURE 1, spaced closely adjacent the rearward rounded end of yoke 58 to relieve stress on pivot pin 60 which connects the yoke to the bracket lugs.

Depending from plate wall 138 is a flange 158 which defines the outer peripheral contour of king pin receiving opening 132. At the forward extremity of opening 132 flange 158 may be made larger in depth and cross section to provide a king pin clamping member or fixed jaw 157 journaling the rear end of a jaw operating screw 196.

Flanges 152 each have connected thereto and extending outboardly therefrom a pair of transversely extending parallel flanges or lock guide walls 160 spaced longitudinally of the plate 118 from each other to define therebetween a lock receiving channel or slot 162 open at its inboard extremity and at the bottom thereof, closed at its outboard extremity by flange 150, and closed at the top by plate wall 138. The rearwardmost wall 160 is in alignment with rib 159 to provide an extended surface on one side of channel 162.

The rearwardmost wall 160 of each pair also may be provided with a depending projection or lug 164 offset rearwardly and outboardly therefrom having an aperture 166 which is longitudinally aligned with a similar aperture 168 in the front section of flange 140. The function of the apertures 166 and 168 is to receive a lock operating rod 260 hereinafter described.

Forwardly and rearwardly of walls 160, flanges 152 have enlarged portions presenting vertically disposed bolt holes 170, the purpose of which is hereinafter described.

Referring now to FIGURES 6 and 7 of the drawings, it will be seen that movable jaw 134 is somewhat rectangular in shape, as seen in plan, with an elongated forward portion. The jaw comprises spaced sides or arms 172, the forward ends of which are offset inwardly from the rearward ends to form a narrower forward portion. At their forward and rearward ends, arms 172 are interconnected by integral front and rear end sections or walls 174 and 176, respectively. The arms and end sections define therebetween a king pin receiving aperture 180. Front end section 174 has an enlarged center portion 178 with a threaded aperture 182 extending longitudinally therethrough. Rear end section 176 also presents an enlarged center section 184 presenting an internal vertical forwardly facing semicylindrical surface 186 adapted to cooperate with a complementary vertical rearwardly facing semi-cylindrical surface 188, presented by the fixed jaw 157 of locking plate 118, and thereby provide a cylindrical opening for receiving and retaining a king pin 190 of trailer 11 supported by locking plate 118. At its outboard ends, rear section 176 presents a pair of coplanar rearwardly facing generally vertical abutment surfaces 192.

Jaw 134 is carried by locking plate 118, for sliding movement longitudinally thereof, on the under side of horizontal wall 138 by a pair of generally rectangular flat plates 194 disposed at opposite sides of the jaw and each secured to the locking plate by a pair of nut and bolt assemblies 195 extending through related apertures 170 of the locking plate. Movement of jaw 134 is achieved by means of a jaw operating screw 196 having its opposite ends supported for rotative movement by the locking plate and being threadably received intermediate its ends in jaw aperture 182. At its rearward extremity, jaw screw 196 has an offset non-threaded end portion 198, which is journaled within an aperture 200 presented by locking plate jaw 157. Screw 196 is provided with a rearwardly facing shoulder 206 which is engageable with forwardly facing surface 208 of jaw 157 to prevent rearward movement of the screw.

Inwardly adjacent its forward extremity, screw 196 is provided with an integral annular collar 210, of larger diameter than the main body, which is disposed within an aperture 212 in the front section of plate flange portion 140. Forwardly of collar 210, screw 196 is provided with journal portion 214, of lesser diameter than that of the collar, which is disposed within an aperture 216 of a cover plate 218 which may be secured to the front side of flange portion by nut and bolt assemblies 220. Thus, it will be seen that screw 196 is free to rotate relative to locking plate 118 while its rotative movement effects the movement of jaw 134 relative to the locking plate. At its forward extremity, screw 196 may be provided with a squared end 222 to accommodate the rotation of the screw by means of a manual or power operated wrench.

FIGURES 8-10 of the drawings illustrate one of a pair of dual locks or locking members 224 which are disposed within channels 162 (one of which is seen in FIGURE 3) and retained in said channels by the lock and jaw cover plates 194. Each lock 224 is somewhat rectangular, as seen in plan and end elevation, comprising a main portion or body 226 having at its outboard end, relative to its position in the locking plate channel, a pair of spaced vertical side walls 228 interconnected approximately centrally of the body by a vertical cross wall 230. The side and cross walls define a spring cavity 232 therebetween which extends longitudinally of the lock and open at its outboard end (the left side as seen in FIGURE 9) and open at the top (as seen in FIGURE 10), and closed at its inboard end by cross wall 230 which presents on its outboard side a spring seat 234 with spring locating boss 258.

Forwardly of wall 230 the lock body presents a generally rectangular, as seen in FIGURE 9, inboardly extending nose or locking portion 236 having side surfaces 238, a front surface 240, and parallel top and bottom surfaces 242 and 244, respectively. The top and sides of nose 236 may be chamfered as at 246 and 248, respectively, to provide somewhat of a truncated wedge on the front end of the nose.

At its outboard end, lock body 226 is provided with a depending stop wall 250 which extends across the body in a direction normal to side walls 228 and parallel to cross wall 230. A vertical rib 252 may be provided outboardly of wall 250 to afford additional rigidity for the wall. The upper portion of wall 250 may be recessed, as seen in FIGURE 9, to form a preferably rounded cavity or notch 254.

Locks 224 are carried in respective channels 162 of the locking plate for sliding movement transversely of the plate so that the nose side walls 238 which face forwardly of the locking plate are engageable with the respective rearwardly facing abutment surfaces 192 on opposite ends of movable jaw rear end section 176 when the jaw 134 is in its forwardmost or king pin clamping position.

Each lock 224 is urged to move inboardly toward the locking plate king pin aperture 132 by a preferably coil compression spring 256 compressibly interposed in related lock spring cavity 232 between lock cross wall spring seat 234 and spring seat 259 on flange 150.

Operation of each lock 224 to move it to lock-set position, as explained more in detail later in the specification, is accomplished by means of an operating rod 260 which extends longitudinally of the locking plate and is carried thereby for rotation about its longitudinal axis relative to the locking plate. Each rod 260 comprises a main body or shaft 262 having a handle 264 at the forward end thereof and having an offset loop or bail 266 forwardly adjacent the rearward end thereof. Each rod is disposed with its rear end journaled in aperture 166 of locking plate flange 164, with its forward end journaled in aperture 168 of locking plate flange 140 and with its bail 266 disposed inboardly adjacent stop wall 250 of related lock 224. Handle 264 of each rod is disposed forwardly of flange 140 to limit rearward movement of the rod. Forward movement of each rod may be prevented by means of washer 268 and pin or cotter 270 disposed rearwardly of wall 164.

Now to describe the operation of the invention, and first the elevation of locking plate assembly 14, it will be understood from an examination of FIGURE 1, that the rotation of elevating screw 42 in one direction will cause vertical support frame assembly 18 to move forwardly relative to base plate 22 urging diagonal support frame assembly 20 to angle upwardly from the base plate and thereby raise the locking plate assembly 14 relative to the base plate. In a like manner, rotation of the elevating screw in the opposite direction will cause the vertical support frame assembly to move rearwardly urging the diagonal support frame assembly to angle downwardly toward the base plate and lower the locking plate assembly toward the base plate. Such rotation of the elevating screw can be accomplished by the application of either a manually operated or power operated wrench to the square head 52 presented by the forward extremity of the elevating screw.

It will be understood that during the initial phase of the elevation operation, as elevating or accelerating springs 54 are compressibly interposed between base plate 22 and the underside of the locking plate horizontal wall 138, the force exerted by the springs against the locking plate relieves, to some extent, the initial torque required to rotate the elevating screw. It will be understood that when the king pin clamping jaw is in its rearward most position in the locking plate, aperture 180 will be completely exposed to facilitate entry of king pin 190 of the trailer.

After the locking plate is in its elevated position, as seen in FIGURE 1, with a trailer supported thereon, the king pin of which is connected to the locking plate assembly, center and side stops 30 and 32, respectively, engage crosshead 126 of vertical support frame 18 to prevent any movement of the vertical support frame and locking plate assembly in a direction upwardly from or forwardly of base plate 22 which might be caused by longitudinal shocks incurred by the trailer. Transverse bar 128 of the cross head is receivable in openings 36 of center stops 30 and cross head side lugs or flanges 37 of cross head arms 124 are receivable in openings 40 of the side stops 32.

As can be seen by both FIGURES 1 and 2, the connection between the lower or rearward end of diagonal support frame and the yoke, pivoted to base plate 22, includes the cushioning device or draft gear assembly 66 which serves to yieldingly resist longitudinal shocks incurred by the locking plate assembly. This includes both draft and buffing forces, for in the case of either type of force applied to diagonal support frame, the tendency of front and rear wedges 76 to move toward or away from each other will be resisted both frictionally and resiliently by the wedges and springs of the cushioning device.

Operation of the jaw and lock mechanisms of the locking plate assembly can best be understood by reference to FIGURES 3–5 of the drawings. Each jaw 134 is carried by locking plate 118 beneath horizontal wall 134 for longitudinal sliding movement relative to the locking plate. Jaw cover or retaining plates 194 serve to support the jaw, as well as the locks, and movement of the jaw in a longitudinal direction is achieved by rotation of jaw screw 196 which is journaled adjacent its ends in the locking plate and which is threadably connected intermediate its ends to the forward wall or section of the movable jaw.

When the movable jaw 134 is in rearward most portion (as seen in FIGURE 2) its king pin receiving opening 180 is in registry with king pin receiving aperture 132 of locking plate 118, so that after a semi-trailer has been spotted on the floor of the railway flat car, and the locking plate assembly has been elevated in the manner previously described, the king pin of the trailer will be received within both of the king pin receiving openings. These openings are both preferably appreciably larger than necessary in order to facilitate spotting of the trailer over the support.

After the locking plate assembly has been elevated with the trailer king pin disposed to extend vertically through the king pin receiving openings of both the jaw and locking plate, movable jaw 134 is moved forward, by the rotation of jaw screw 196, to its forwardmost position whereat king pin 190 is securely clamped between the rearwardly facing semi-cylindrical vertical surface 188 of the locking plate fixed jaw 157 and the forwardly facing semi-cylindrical vertical surface 186 of the movable jaw 134. Upward movement of the king pin is prevented by the engagement of king pin flange 197 with lips 187 and 189 presented by the jaws 134 and 157, respectively, as best seen in FIGURE 4.

In order to retain or lock jaw 134 in its forwardmost position, there are provided a pair of locking mechanisms (one of which is shown as they are similar) disposed adjacent opposite sides of the jaw at the rear of the jaw when it is in its forwardmost position.

Each lock 224, the structure of which has been previously described in detail in connection with FIGURES 8–10, is carried by the locking plate 118 in related channel 162, defined by locking plate walls 160, for sliding movement transversely of the locking plate. Each jaw retainer plate 194 also serves to support the related lock as well as an adjacent arm of the jaw 134. Channels 162 are so located, as seen in FIGURE 3, that when each lock is in its inboardmost position the forwardly facing side surface 238 of the lock 236 is abuttably engageable with the respective rearwardly facing surface 192 presented by the rear section 176 of the jaw 134. This position is the locked position as illustrated in the solid lines of FIGURE 5 and the phantom lines of FIGURE 3. With the lock in this position, rearward movement of the jaw relative to the king pin and/or the locking plate is prevented.

The pressure exerted by each spring 256 against its related lock urges the lock into locked position. Movement of the lock in an inboard direction, when the jaw is not in its forwardmost position, is prevented by the jaw itself, and inboard movement of the lock when the jaw is in its most forward position, is limited by flange 152 which engages the forward edge of the body of lock wall 230.

Movement of each lock from locked position to lock-set position (the position indicated by phantom line A in FIGURE 5 and by the solid line in FIGURE 3) by the manual rotation of its related operating rod 260 in a counterclockwise direction. As bail 266 of the rod engages the inboardly facing surface of lock stop wall 250, the lock is urged to move, against the pressure of spring 256, in an outboard direction until the lock reaches lock-set position. At this point, the bail of rod 260 is lodged in recess 254 of lock stop wall 250 and inboard movement of the lock is prevented. At this point only the forwardly facing chamfered or diagonal side edges 248 of the noses are in line with the rearwardly facing surfaces 192 of the jaw. Thus, it is apparent that as the jaw is moved rearwardly by rotation of the jaw screw, the rear corners of the jaw contact nose surfaces 248 of the respective locks and, by a camming action, urge each lock to move outboardly to lock-set release position (as shown by phantom line B in FIGURE 5), thereby permitting the jaw to be moved to its extreme rearward or open position. It will be noted that as the lock is so moved to lockset release position, the bail of the operating rod is no longer retained in recess 254 of the lock stop wall so that it falls by force of gravity to its normal locked position, thereby permitting the lock to be returned to locked position by the action of the spring as soon as the jaw is again moved to its forwardmost position.

We claim:

1. In a fifth wheel assembly for detachable engagement with a trailer king pin having a reduced neck portion, a locking plate having an elongated opening, a fixed jaw on said plate at one end of said opening and having a lip adapted to engage one side of said neck portion, a movable jaw guided for linear movement along the lower side of said plate and having an opening for registry with said elongated opening in said plate to receive said king pin, said movable jaw having a lip adapted to engage the other side of said neck portion, means to move said movable jaw relative to said fixed jaw, means operable automatically responsive to movement of the movable jaw to its king pin clamping position to lock said movable jaw against movement relative to said fixed jaw, said locking means comprising two locks mounted on the locking plate on opposite sides of the fixed jaw for engagement by the movable jaw, and spring means urging said locks toward said fixed jaw for engagement by the movable jaw.

2. In a fifth wheel assembly for detachable engagement with a trailer king pin having a reduced neck portion, a locking plate having an elongated opening, a fixed jaw on said plate at one end of said opening and having a lip adapted to engage one side of said neck portion, a movable jaw guided for linear movement along the lower side of said plate and having an opening for registry with said elongated opening in said plate to receive said king pin, said movable jaw having a lip adapted to engage the other side of said neck portion, means to move said movable jaw relative to said fixed jaw, means operable automatically responsive to movement of the movable jaw to its king pin clamping position to lock said movable jaw against movement relative to said fixed jaw, said locking means comprising two locks mounted on the locking plate on opposite sides of the fixed jaw for engagement by the movable jaw, spring means urging said locks toward said fixed jaw for engagement by the movable jaw, and individual means manually operable to retract the locks out of engagement with said movable jaw.

3. In a fifth wheel assembly for detachable engagement with a trailer king pin having a reduced neck portion, a locking plate having an elongated opening, a fixed jaw on said plate at one end of said opening and having a lip adapted to engage one side of said neck portion, a movable jaw guided for linear movement along the lower side of said plate and having an opening for registry with said elongated opening in said plate to receive said king pin, said movable jaw having a lip adapted to engage the other side of said neck portion, means to move said movable jaw relative to said fixed jaw, means operable automatically responsive to movement of the movable jaw to its king pin clamping position to lock said movable jaw against movement relative to said fixed jaw, said locking means comprising two locks mounted on the locking plate on opposite sides of the fixed jaw for engagement by the movable jaw, spring means urging said locks toward said fixed jaw for engagement by the movable jaw, and individual means manually operable to retract the locks out of engagement with said movable jaw, said individual means comprising two rods rotatably mounted on the locking plate and each having an offset portion to engage and move its respective lock.

4. In a fifth wheel assembly for detachable engagement with a trailer king pin having a reduced neck portion, a locking plate having an elongated opening, a fixed jaw on said plate at one end of said opening and having a lip adapted to engage one side of said neck portion, a movable jaw guided for linear movement along the lower side of said plate and having an opening for registry with said elongated opening in said plate to receive said king pin, said movable jaw having a lip adapted to engage the other side of said neck portion, means to move said movable jaw relative to said fixed jaw, means operable automatically responsive to movement of the movable jaw to its king pin clamping position to lock said movable jaw against movement relative to said fixed jaw, said locking means comprising two locks mounted on the locking plate on opposite sides of the fixed jaw for engagement by the movable jaw, spring means urging said locks toward said fixed jaw for engagement by the movable jaw, and individual means manually operable to retract the locks out of engagement with said movable jaw, said individual means comprising two rods rotatably mounted on the locking plate and each having an offset portion to engage and move its respective lock, said locks being held in their retracted positions by engagement of the offset portion in recesses formed in the locks.

References Cited in the file of this patent

UNITED STATES PATENTS

| | | |
|---|---|---|
| 2,036,344 | Menhall | Apr. 7, 1936 |
| 2,099,288 | Allen | Nov. 16, 1937 |
| 2,861,818 | Kayler et al. | Nov. 25, 1958 |

FOREIGN PATENTS

| | | |
|---|---|---|
| 1,029,027 | Germany | Apr. 30, 1958 |

OTHER REFERENCES

"A.C.F. Retractible Trailer-Hitch," Railway Age, November 12, 1956.